United States Patent [19]

Alfors

[11] Patent Number: 5,164,668
[45] Date of Patent: Nov. 17, 1992

[54] ANGULAR POSITION SENSOR WITH DECREASED SENSITIVITY TO SHAFT POSITION VARIABILITY

[75] Inventor: Eugene D. Alfors, Rockford, Ill.

[73] Assignee: Honeywell, Inc., Minneapolis, Minn.

[21] Appl. No.: 804,854

[22] Filed: Dec. 6, 1991

[51] Int. Cl.⁵ .......................... G01B 7/30; G01B 7/14
[52] U.S. Cl. .......................... 324/207.20; 324/207.12; 324/207.25
[58] Field of Search .................. 324/207.20, 207.21, 324/207.25, 235, 251, 252, 174, 175; 123/414, 617; 310/156; 73/119 R, 517 R, 518, 519, DIG. 3

[56] References Cited

U.S. PATENT DOCUMENTS

| | | | |
|---|---|---|---|
| 1,561,452 | 11/1925 | Alden | 310/156 X |
| 2,218,859 | 10/1940 | Schweitzer, Jr. | 310/156 X |
| 2,768,315 | 10/1956 | Okabe | 310/156 X |
| 3,460,033 | 8/1969 | Weir et al. | 324/174 |
| 4,373,486 | 2/1983 | Nichols et al. | 73/116 X |
| 4,381,506 | 4/1983 | Linn et al. | 340/870.32 |
| 4,406,272 | 9/1983 | Kiess et al. | 123/617 |
| 4,471,652 | 9/1984 | Yasuhara et al. | 73/116 |
| 4,570,118 | 2/1986 | Tomczak | 324/207.20 |
| 4,665,362 | 5/1987 | Abel et al. | 324/207.20 |
| 4,677,377 | 6/1987 | Takahashi et al. | 324/207.21 X |
| 4,785,242 | 11/1988 | Vaidya et al. | 324/207.25 |
| 4,789,826 | 12/1988 | Willett | 324/207.20 |
| 4,914,389 | 4/1990 | Juds | 324/207.21 |
| 4,926,121 | 5/1990 | Guay | 324/207.20 |

FOREIGN PATENT DOCUMENTS

| | | | |
|---|---|---|---|
| 0060157 | 5/1977 | Japan | 324/207.2 |
| 0122113 | 9/1980 | Japan | 324/207.2 |
| 86405 | 5/1983 | Japan | 324/207.21 |
| 0027219 | 2/1984 | Japan | 324/207.2 |
| 464755 | 12/1968 | Switzerland | 324/207.2 |

OTHER PUBLICATIONS article "Annular Magnet Position Sensor" by G. & V. Lemarquand IEEE Transactions on Magnetics vol. 26, No. 5, Sep. 1990.

*Primary Examiner*—Gerard R. Strecker
*Attorney, Agent, or Firm*—William D. Lanyi

[57] ABSTRACT

An angular position sensor is provided with first and second pole pieces that extend from regions proximate a rotatable magnet to regions proximate a magnetically sensitive device. The pole pieces provide defined magnetic paths of lowered reluctance that confine the lines of flux extending between the rotatable magnet and the magnetically sensitive device. The placement of the rotatable magnet between first and third pole piece segments of the invention significantly reduces the sensitivity of the sensor to variations in position of the rotatable magnet and therefore increases the reliability of the measurement system. This reduced sensitivity inhibits the degradation of operational accuracy that could otherwise be caused by inaccuracies in the magnet's shaft position, large tolerances in the dimensions of the shaft diameter and the bearing diameter and variable location of the shaft because of excessive bearing wear.

15 Claims, 6 Drawing Sheets

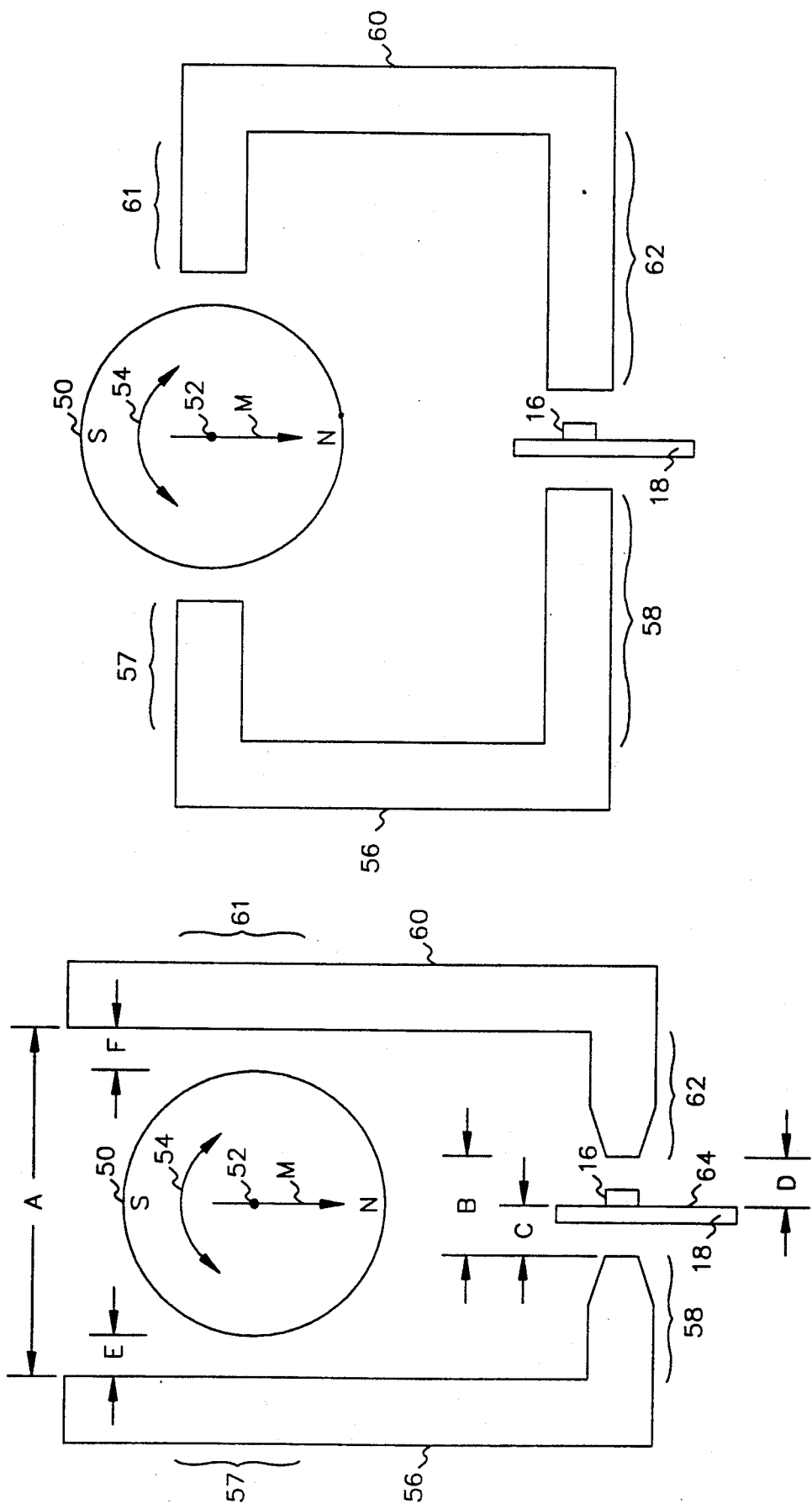

ANGULAR POSITION SENSOR WITH DECREASED SENSITIVITY TO SHAFT POSITION VARIABILITY

BACKGROUND OF THE INVENTION

1. Field of the Invention

The present invention relates generally to angular position sensors and, more particularly, to an angular position sensor which utilizes a rotatable magnet in cooperation with a magnetically sensitive device to identify the angular position of a rotatable shaft.

2. Description of the Prior Art

Many types of angular position sensors are known to those skilled in the art. Some of these position sensors utilize magnetically sensitive devices in association with rotatable magnets. In some cases, the magnetically sensitive device is a Hall effect element.

U.S. Pat. No. 4,406,272, which issued to Kiess et al on Sep. 27, 1983, discloses a magnetic sensor for use in an ignition system of an automobile. The sensor is useable in an internal combustion engine of the automobile and disposes a Hall effect device between a pair of opposing permanent magnets for concurrently generating dual magnetic flux fields within respective airgap regions formed between each of the magnets and the device. A toothed disc rotatably connected to the crank shaft of the engine causes different teeth to shunt the field in each of the regions in a predetermined sequence for generating pulses at the device output indicative of the firing order of the engine.

U.S. Pat. No. 4,373,486, which issued to Nichols et al on Feb. 15, 1983, describes a rotational position and velocity sensing apparatus in which a ferrous disc is rotatable driven by an internal combustion engine shaft. The disc is provided with inner and outer circular rims that project outwardly from one side of the disc. The outer rim has two arcuate notches of predetermined arcuate length and position and the inner rim has three arcuate notches of predetermined arcuate length and position. A permanent magnet is mounted between and radially spaced from two Hall effect sensor devices in fixed relation to the shaft axis such that the outer rim passes between one Hall effect device and the magnet and the second rim passes between the second Hall effect device and the magnet as the shaft is rotated about its central axis.

U.S. Pat. No. 4,471,652, which issued to Yasuhara et al on Sep. 18, 1984, describes a position detector for a rotary element in which a permanent magnet is mounted on the rotary member by a nonmagnetic holder that magnetically and thermally insulates the magnet from the rotary member for the purpose of prolonging the life of the magnet and obviating the noise that is normally produced by a stationary pickup that is excited by the passing magnet.

U.S. Pat. No. 4,381,506, which issued to Linn et al on Apr. 26, 1983, discloses a position signal transducer which provides a vibration and shock insensitive apparatus by winding a coil of a lamella-like carrier which has a body element of electrically insulating material on which a foil of magnetically highly permeable material is positioned on at least one surface. The lamella-like foil combinations can be stacked or, alternatively, a unitary body with foils on both sides can be provided. A short circuit ring, which is moveable along the core, changes the inductance of the coil wound thereon.

U.S. Pat. No. 4,789,826, which issued to Willett on Dec. 6, 1988, describes a system for sensing the angular position of the rotatable member by using a Hall effect transducer. The device senses the angular rotation of a member, such as the shaft of a tension arm assembly, by the combination of a circular type of magnet secured to the rotatable member and selectively polarized relative to its diameter to define a magnetically North and magnetically South pole pair. It also comprises a stationary Hall effect transducing device that is secured in close and constant proximity to the ring magnet. A circuit coupled to the transducing device includes offset and amplification stages. The Hall effect transducing device is located in the region of a magnetic null of the field generated by the magnetic poles when the rotatable member is in a selected angular position.

U.S. Pat. No. 4,785,242, which issued to Vaidya et al on Nov. 15, 1988, describes a position detecting apparatus that uses multiple magnetic sensors for determining relative and absolute angular positions. The apparatus utilizes a first magnetic sensing device for accurately determining the angular position of a rotor and a second magnetic sensing device for absolutely determining the angular position of the rotor. The first sensing device includes a first target operatively associated with the rotor so as to rotate therewith and also incudes a first sensor disposed at a fixed distance from the first target independent of the absolute angular position of the rotor to define a first airgap therebetween and a first magnet is disposed in proximity to the first target and the first sensor to create a first magnetic field in the first airgap.

U.S. Pat. No. 4,677,377, which issued to Takahashi et al on Jun. 30, 1987, discloses a position detecting sensor for detecting the position of a moving object. It comprises a magnetic recording medium carried on a moving object and having a signal track recording a magnetic signal, a first MR element disposed near the magnetic recording medium and varying its internal resistance by sensing the magnetism of the magnetically recording medium and a magnetic sensor electrically picking up resistance variations of the MR element and detecting the magnetic signal of the magnetic recording medium.

An article titled "Annular Magnet Position Sensor", by G. Lemarquand and V. Lemarquand, which appeared in the IEEE Transactions on Magnetics, Volume 26, Number 5 in Sep. 1990, describes an absolute permanent magnet angular position sensor which utilizes two magnetically sensitive devices. The geometry of the device was optimized to obtain a perfectly linear variation law of the normal induction in the air gap. The sensor is characterized by a simple electronic treatment, a low realization cost and a resolution of approximately a tenth of a degree. This sensor utilizes a shaped magnet disposed around a core rotor and disposed within a stator that is made of a magnetic material. Two magnetically sensitive devices, such as Hall effect generators, are arranged between the rotatable magnet and the stator at different positions to enable associated electronic circuitry to accurately determine the angular position of the stator as a function of the signals received from the two Hall effect devices.

U.S. Pat. No. 4,570,118, which issued to Tomczak on Feb. 11, 1986, describes an angular position transducer which includes permanent magnets and a Hall effect device. It provides a transducer for creating an electrical signal which is proportional to the angular position of a member that is pivotally mounted on a given axis. It comprises an element pivoted directly by the member and containing a means for creating a flux field linearly varying intensity along a given operating line extending in an airgap between spaced portions and having a preselected arcuate shape. A linear Hall effect device, with an output voltage that is proportional to the intensity of the flux field to which the device is disposed, is mounted at a fixed position on the operating line and within the airgap. Consequently, as the element is pivoted by the monitored member, the output voltage from the Hall effect device varies proportionally to the position of the Hall effect device along the operating line.

Position sensing devices that utilize a magnet and a magnetically sensitive device, such as a Hall effect device, suffer from a common disability because the relative position of the Hall effect element with respect to the magnet is critical to the proper operation of the apparatus and even minor deviations in that distance can adversely affect the accuracy of the device. Since the magnet is most commonly caused to rotate in an apparatus of this kind, a shaft is generally used and a bearing is required to support the shaft for rotation about a central axis. If the relative sizes of the shaft and its bearing are not accurately maintained, the shaft can assume varying positions relative to the bearing and the magnet can therefore assume variable positions relative to the magnetically sensitive device. Because of the inverse square relationship between the distance that a Hall effect device is offset from a magnet and the magnetic strength imposed on the Hall effect device, relatively slight deviations in the position of the magnet have significant deleterious results on the accuracy of the system because of the unpredictable strength of the magnetic field at the position of the Hall effect element. It would therefore be beneficial if a angular position sensor can be constructed in such a way that the magnetically sensitive device is relatively insensitive to minor changes in the position of the rotatable magnet in an angular position sensor.

SUMMARY OF THE INVENTION

The present invention provides an angular position sensor in which a magnetically sensitive device, such as a Hall effect element, is relatively insensitive to minor changes in the position of a rotatable magnet. In a most preferred embodiment of the present invention, the rotatable magnet is attached to a throttle mechanism of an automobile so that a signal from a Hall effect element circuit is representative of the angular position of the throttle.

In a preferred embodiment of the present invention, the angular position sensor comprises a rotatable magnet arranged for rotation about a first axis. In addition, a magnetically sensitive device, such as a Hall effect element, is spaced apart from the rotatable magnet. A first pole piece having a first pole piece segment and a second pole piece segment is provided for disposal relative to both the rotatable magnet and the magnetically sensitive device. The angular position sensor of the present invention also comprises a second pole piece having a third pole piece segment and a fourth pole piece segment, wherein the first and third pole piece segments are spaced apart from each other and disposed on opposite sides of the rotatable magnet on a first imaginary line which extends through the magnet. The second and fourth pole piece segments are spaced apart from each other and disposed on opposite sides of the magnetically sensitive device on a second imaginary line which extends through the magnetically sensitive device. In a preferred embodiment of the present invention, the magnetically sensitive device is a Hall effect device and the first imaginary line is perpendicular to the first axis. In addition, in one embodiment of the present invention, the first and second pole pieces are disposed in a common plane which is perpendicular to the first axis and the rotatable magnet is attached to a rotatable shaft of a throttle mechanism. In one preferred embodiment of the present invention, the sensor also comprises an amplification circuit that is connected in electrical communication with the magnetically sensitive device to provide an output that is representative of the magnetic field strength imposed on the magnetically sensitive device. In addition, a microprocessor is connected in signal communication with the output of the amplification circuit. In the preferred embodiment of the present invention, the first and second pole piece, the magnet and the Hall effect element all combine to provide a continuous magnetic circuit having airgaps between the first and third pole piece segments and the magnet and also between the second and fourth pole piece segments and the magnetically sensitive device. By associating the rotatable magnet in magnetically coupled relation with two pole pieces which are, in turn, associated in magnetically coupled relation with each other, the strength of the magnetic field proximate the Hall effect element is not adversely affected by slight changes in the position of the rotatable magnet relative to a fixed axis of rotation or relative to the fixed positions of the pole pieces.

BRIEF DESCRIPTION OF THE DRAWINGS

The present invention will be more clearly and fully understood from a reading of the Description of the Preferred Embodiment in conjunction with the drawing, in which:

FIG. 4 shows one embodiment of the present invention;

FIG. 5 shows an alternative embodiment of the present invention;

DESCRIPTION OF THE PREFERRED EMBODIMENT

Figure 1:
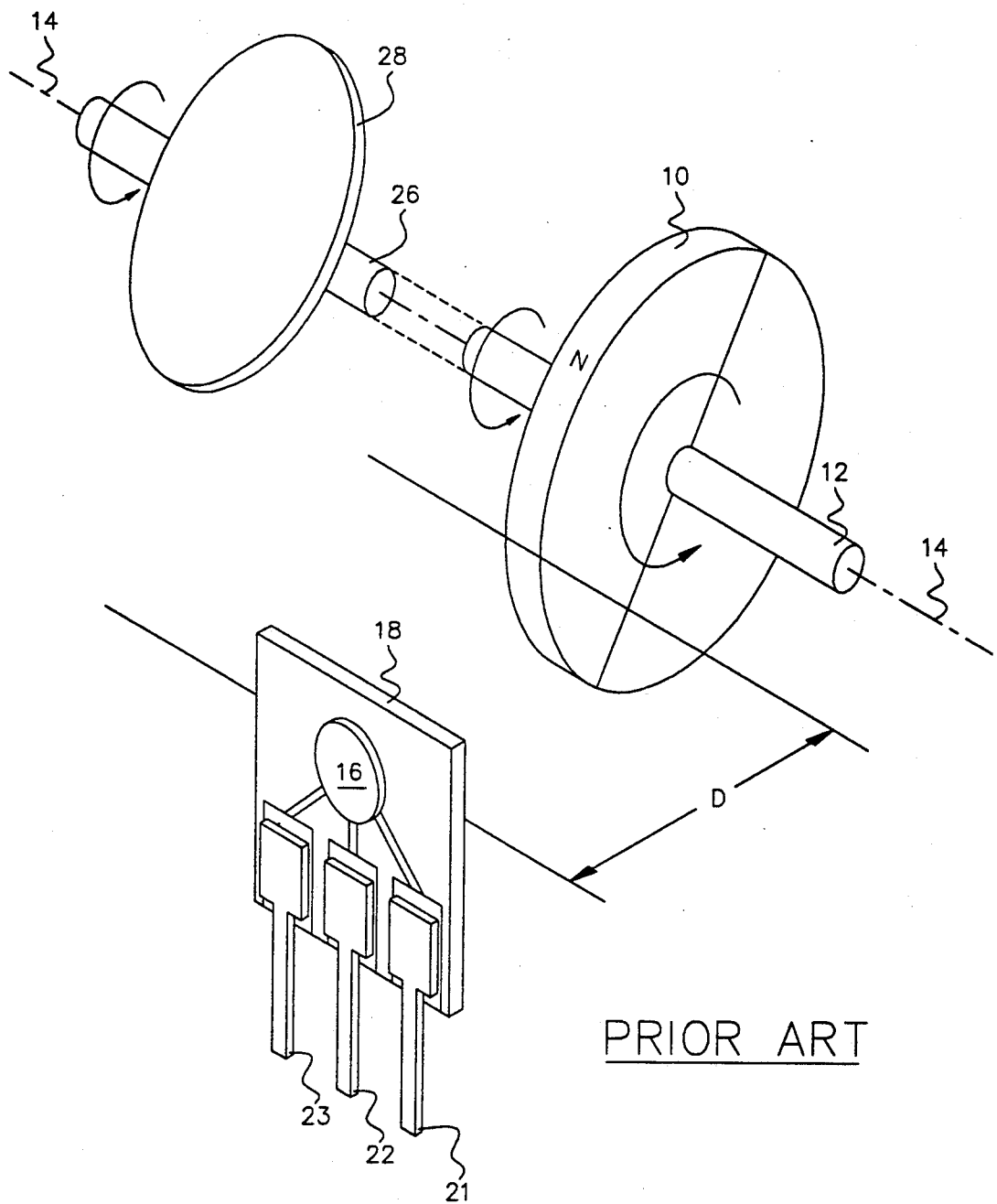
FIG. 1 shows a typical arrangement of a rotatable magnet, a Hall effect element and a throttle mechanism.

Throughout the Description of the Preferred Embodiment, like components and elements will be identified with like reference numerals.

In FIG. 1, a rotatable magnet 10 is shown attached to a shaft 12 for rotation about a central axis 14. A Hall effect element 16 is disposed on a printed circuit board 18 and spaced apart from the rotatable member 10 by a gap distance, which is identified by the letter D in FIG. 1. As can be seen, the printed circuit board 18 has a plurality of leads 21-23 extending therefrom to enable power to be provided to the Hall effect element 16 and signals to be received either from the Hall effect element itself or from an amplification circuit on the printed circuit board 18. The shaft 12 is operatively associated with a shaft 26 that is attached to a throttle mechanism 28. As shown in FIG. 1, the two shafts, 12 and 26, are disposed on a common central axis 14. However, it should be understood that the two shafts can alternatively be associated with each other through a geared mechanism and not necessarily disposed on a common central axis of rotation.

Figure 2:
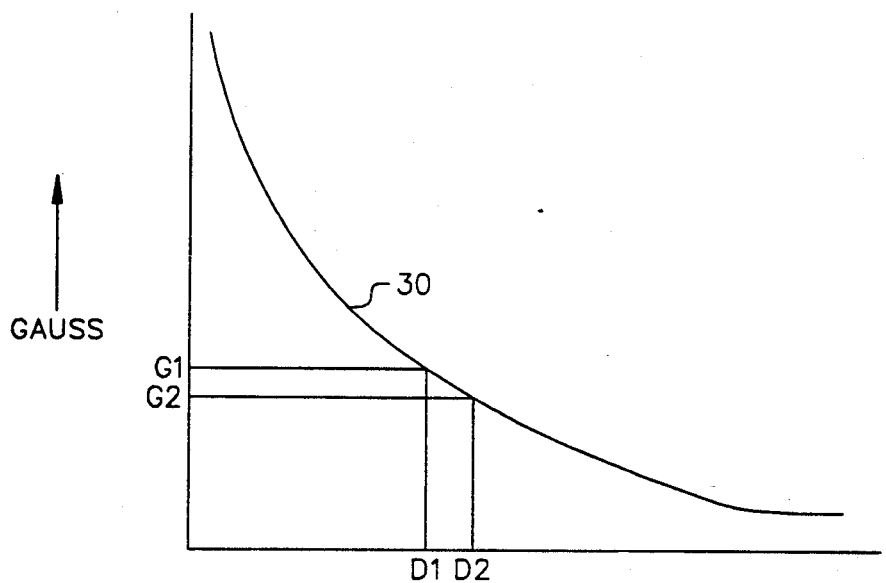
FIG. 2 shows the relationship between the magnetic strength imposed on a Hall effect element and the distance between the Hall effect element and the source of the magnetic flux.

The strength of the magnetic field imposed on the Hall effect element 16 by the magnet 10 is determined by the inverse square relationship and is therefore inversely proportional to the magnitude of the dimension identified as D in FIG. 1. FIG. 2 illustrates this relationship.

With reference to FIGS. 1 and 2, the relationship identified by line 30 illustrates this inverse square function for two magnitudes, D1 and D2, of the gap distance D. If all other parameters remain constant, a change in distance from location D1 to location D2 will have the effect of reducing the strength of magnetic field on the Hall effect element 16 from the magnitude identified as G1 to the magnitude identified as G2. One of the most severe problems relating to the use of rotating magnets and magnetically sensitive devices to measure angular position is the requirement that the distance between the center of the rotatable magnet and the Hall effect element must be constant for all measurements. If any changes in this dimension occur, the magnitude of the gap distance D changes and, as illustrated in FIG. 2, a change in the magnitude of gap distance D has a significant nonlinear effect on the intensity of the magnetic field at the location of the Hall effect element 16. This problem is particular severe in certain types of applications, such as in the engine control system of an automobile, where the output signals from the Hall effect circuit are used to control other operating parameters of an internal combustion engine. Although the control system for an automobile engine can be calibrated after initial assembly to accommodate for a specific value of gap distance D, any inconsistency or variability in the magnitude of gap distance D will severely affect the ability of the system shown in FIG. 1 to accurately determine the angular position of the throttle 28. The adverse effects of variability in the magnitude of gap distance D creates significant problems in designing systems of the kind shown in FIG. 1. For example, rather than applying inexpensive bearings to support shaft 12, more accurate and expensive bearings may be required to avoid the larger bearing tolerances that normally accompany inexpensive bearings. Since larger tolerances between the dimension of shaft 12 and the internal diametric dimension of the associated bearing will permit a degree of variability in position between the fixed bearing and the central axis 14, the use of less expensive bearings can lead to severe operational problems in the overall system. Another related problem that is caused by the relationship shown in FIG. 2 is that bearing wear will cause a gradual shifting in the steady state position of the central axis 14. Although this type of problem will generally move the central axis 14 in one consistent direction, the magnitude of that movement will affect the magnitude of gap distance D and will also exacerbate the variability of the shaft position within the bearing because of this wear and permit an unacceptable amount of wobble between the shaft and the bearing.

Although angular position sensors used in association with throttle mechanisms typically only rotate 90 degrees, certain other applications using rotatable magnets involve complete rotations of the magnet about its central axis. Whether the rotatable magnet rotates in a 90 degree range or rotates completely about its axis, the relationship shown in FIG. 3 is applicable to illustrate the problems caused by changes in the magnitude of gap distance D which is shown in FIG. 1.

Figure 3:
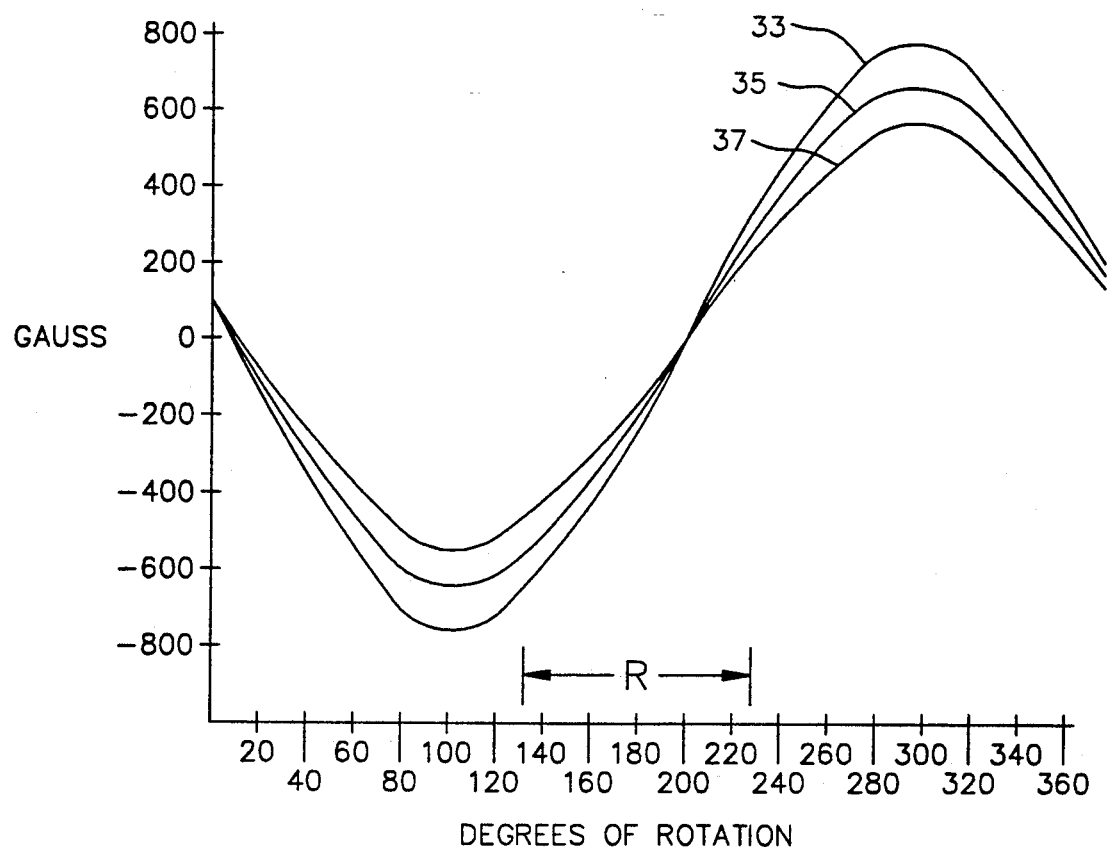
FIG. 3 illustrates the relationship between the strength of the magnetic field imposed on a Hall effect element and the angular position of a rotatable magnet proximate the Hall effect element.

FIG. 3 illustrates the relationship between the magnitude of the magnetic field at the Hall effect element 16, measured in gauss, and the rotational position of the rotatable magnet 10, measured in degrees of rotation. As can be seen, FIG. 3 shows three sinusoidal curves that represent these relationships for three different magnitudes of gap distance D. The curve identified by reference numeral 33 represents the relationship for a gap distance D that is equal to 0.015 inches, curve 35 represents a gap distance D of 0.030 inches and curve 37 represents a gap distance D of 0.050 inches. It can be seen that changes in the magnitude of gap distance D, whether the changes are caused by bearing wear or the tolerance between the bearing shaft dimension and the bearing dimension, introduce significant changes in magnetic field strength at the Hall element 16. Even if the rotation of the magnet 10 is limited to ±45 degrees, as represented by the range identified by "R" in FIG. 3, the errors caused by the variability in gap distance magnitude can be significant and can cause serious errors in the control of a mechanism that is based on outputs from the Hall effect device. It should be understood that the illustrations of FIGS. 2 and 3 are merely representative of a device such as that shown in FIG. 1 and are not intended to accurately portray, in absolute terms, the magnitudes of magnetic field as a relationship of either gap distance or degrees of rotation for any particular type or model of angular position sensor. FIGS. 2 and 3 are intended to illustrate the problem involving the variability in magnitude of gap distance D that is inherent in any angular position sensor utilizing a rotatable magnet 10 and a magnetically sensitive device which are spaced apart as shown in FIG. 1 and which rely on the extension of the lines of magnetic flux across an expanse of air gap distance which is variable in magnitude.

The concepts of the present invention can be embodied in several alternative embodiments. One embodiment of the present invention is illustrated in FIG. 4. A rotatable magnet 50 is supported for rotation about a central axis 52. The rotatable magnet 50 is magnetized in a direction represented by arrow M to have a North magnetic pole and a South magnetic pole as shown. The rotatable magnet 50 is supported for rotation in the directions identified by arrow 54 in FIG. 4. As described above, most angular position sensors that are utilized in throttle assemblies of automobile engines typically rotate 90 degrees from an idle position to a full throttle position. Also shown in FIG. 4 is a printed circuit board 18 with a Hall effect element 16 disposed thereon. As is well known to those skilled in the art, the Hall effect element is actually extremely small in relation to the size of the printed circuit board 18 and, as a result, would not easily be shown in FIG. 4. Therefore, the larger representation identified by reference numeral 16 to show the position of the Hall effect element is actually a cap which is used to protect the Hall effect element. However, this terminology will be continued below in describing the alternative embodiments of the present invention. It should also be clearly understood that most systems that are used to measure the angular position of a rotatable member in the manner described above actually utilize a plurality of Hall effect elements rather than a single Hall effect element. This is done to permit the accuracy of the device to be increased.

With continued reference to FIG. 4, it can be seen that a first pole piece 56 comprises a first pole piece segment 57 and a second pole piece segment 58. A similarly configured second pole piece 60 comprises a third pole piece segment 61 and a fourth pole piece segment 62. The first pole piece segment 57 and the third pole piece segment 61 are spaced apart by a predetermined distance A and disposed on opposite sides of the rotatable magnet 50. The second pole piece segment 58 and the fourth pole piece segment 62 are spaced apart by a predetermined distance B and disposed on opposite sides of the magnetically sensitive device, or Hall effect element 16. In a preferred embodiment of the present invention, the Hall effect element is disposed on one surface 64 of the printed circuit board 18 at a location proximate the midpoint of distance B. This is illustrated by the general equality of dimensions C and D in FIG. 4. However, it should be clearly understood that the equality between dimensions C and D is not a requirement of the present invention and, furthermore, since the magnetic field between the faces of the pole piece segments, 58 and 62, is generally constant throughout the gap between them, the precise position of the Hall effect element between the second and fourth pole piece segment is not critical to the proper operation of the present invention.

In FIG. 4, a first gap E is shown on one side of the rotatable magnet 50 between the magnet and the first pole piece segment 57 and a second gap F is shown between the rotatable magnet 50 and the third pole piece segment 61. If the location of the center of rotation 52 is not perfectly constant, the magnitudes of gaps E and F can change. This inconsistency in position can be caused by the use of an inaccurate bearing or excessive bearing wear, as described above. In addition, the vertical position of the central axis 52 can change and cause the rotatable magnet 50 to move to a position represented by dashed line 66 which is intentionally exaggerated to illustrate this concept.

In operation, the first pole piece 56 provides a magnetic path for the lines of flux that pass from the magnet to the Hall effect element 16. After passing through the relatively small airgap E between the rotatable magnet 50 and the first pole piece, the magnetic field is generally confined within the structure of the first pole piece 56 and passes through this path of least reluctance from the first pole piece segment 57 to the second pole piece segment 58. From the face at the second pole piece segment, the lines of flux extend along generally parallel lines through the Hall effect element 16 and toward the face of the fourth pole piece segment 62. From there, the magnetic field continues to pass along the path of least reluctance which comprises the second pole piece 60. The lines of flux extend through this relatively confined path provided by the second pole piece toward the third pole piece segment 61 from which the lines of magnetic flux extend across a relatively small airgap F toward the opposite magnetic pole from that from which they began. Therefore, the present invention provides a closed magnetic circuit that comprises the rotatable magnet 50, the Hall effect element 16, the first and second pole pieces, 56 and 60, and the relatively small airgaps that exist between the rotatable magnet and the first and third pole piece segments and between the Hall effect element and the second and fourth pole piece segments.

With continued reference to FIG. 4, it should be understood that if the central axis 52 moves in a direction toward either of the pole pieces, a decrease in dimension E will result in an equal increase in dimension F and visa versa. Therefore, the net effect on the magnetic circuit is inconsequential and a movement of this type will not adversely affect the magnetic field passing through the Hall effect element 16. This insensitivity to variations in the position of the rotatable magnet 50 permits a magnetically sensitive device to be utilized in combination with the rotatable magnet to measure the angular position of a throttle device without the operation of the system being adversely effected because of minor variations in the precise position of the rotatable magnet. FIG. 4 shows one simplified embodiment of the present invention for the purpose of describing its operation.

FIG. 5 illustrates an alternative embodiment of the present invention. As can be seen by comparing FIGS. 4 and 5, the general arrangement of these alternative embodiments is similar except for the shape of the first and second pole pieces. In FIG. 5, the first pole piece 56 is generally "C-shaped" rather than "L-shaped" as is the first pole piece 56 shown in FIG. 4. In some applications, the configuration shown in FIG. 5 is advantageous to that shown in FIG. 4. The different characteristic of the C-shaped pole pieces is that the path of the lines of flux between the rotatable magnet 50 and the first and third pole piece segments, 57 and 61, is much more limited. Because of the relatively large surfaces of the pole pieces which are generally proximate the rotatable magnet 50 in FIG. 4, the lines of flux can pass between the rotatable magnet and the pole pieces over a relatively large region, whereas the configuration in FIG. 5 limits this region on both sides of the rotatable magnet 50.

Figure 6:
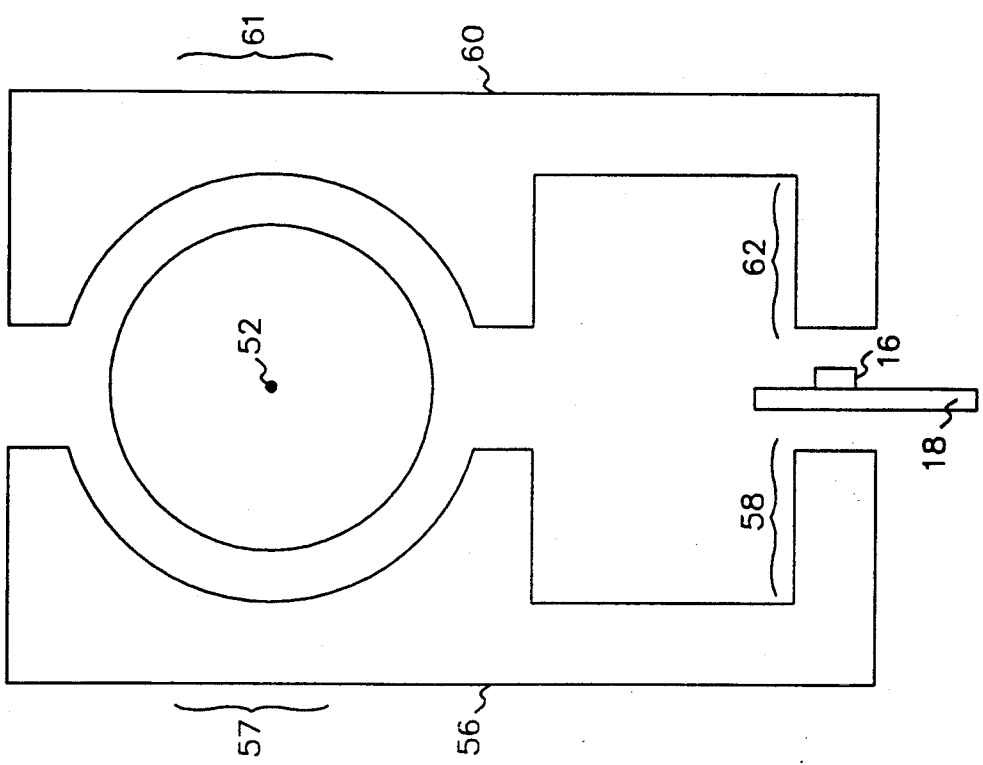
FIG. 6 shows a third embodiment of the present invention.

FIG. 6 illustrates another alternative embodiment of the present invention. As can been seen by comparing FIGS. 4, 5 and 6, the main components of the present invention are present in all three embodiments. Namely, each embodiment comprises first and second pole pieces, 56 and 60. In addition, first and second pole piece segments, 57 and 58, are comprised within the structure of the first pole piece 56 and third and fourth pole piece segments, 61 and 62, are comprised within the structure of the second pole piece 60. The placement of the rotatable magnet 50 is between the first and third pole piece segments and the placement of the magnetically sensitive device, or Hall effect element 16, is between the second and fourth pole piece segments.

With reference to FIG. 6, it can be seen that the first and third pole piece segments, 57 and 61, are specifically shaped to more completely encompass the rotatable magnet 50 than in the other alternative embodiments. Many different physical configurations of the present invention are possible within its scope. The purpose of the different configurations is to accommodate different application requirements and operational parameters, such as magnetic field strength, the distance between the rotatable magnet and the magnetically sensitive device, the permeability of the material used to make the first and second pole pieces and the physical size of the pole pieces, in cross section, for any particular application. For example, if a very small magnet 50 is required in a particular application, the characteristics of the first and second pole pieces must be chosen to accommodate this requirement. Care must also be taken to avoid magnetic saturation within the assembly or excessive inefficiency which would decrease the strength of the magnetic field at the Hall effect element compared to the strength of the field at the rotatable magnet. In some applications, the physical shape of the pole pieces can be particularly designed to compensate for the deficiency of other characteristics. For example, the configuration of the first and third pole piece segments in FIG. 6 serves to provide a relatively short airgap path between the rotatable magnet and the pole pieces, whereas the embodiment shown in FIG. 4 permits a wider airgap path between the rotatable magnet and the pole pieces because of the physical shape of the first and third pole piece segments. However, the shape illustrated in FIG. 6 permits an alternative magnetic circuit to be developed between the lower portions of the first and third pole piece segments which extend inward toward each other. This alternative magnetic circuit path deprives the magnetically sensitive device of a portion of the total magnetic field provided by the magnet. In each of these designs, certain advantages can be achieved at the expense of other disadvantages. Therefore, it should be understood that the particular shape of the pole piece segment and the particular selection of materials and physical sizes of those elements is a function of the specific application in which the present invention is to be used and is not a limitation on its scope.

Figure 7:
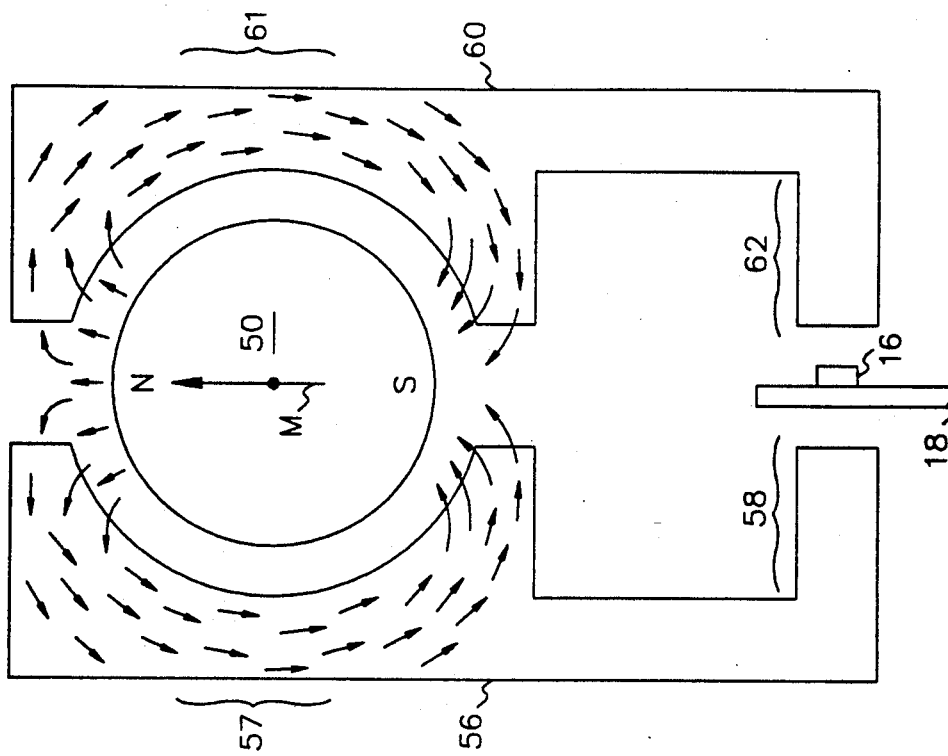
FIG. 7 shows one operative configuration of the third embodiment of the present invention.

To explain the operation of the present invention in greater detail, FIG. 7 illustrates the embodiment of FIG. 6 with the lines of flux shown. For the purpose of this discussion, the lines of flux are illustrated as arrows extending in a direction from the North magnetic pole of the rotatable magnet 50 toward the South magnetic pole. It can be seen that the lines of flux extend through the airgap between the rotatable magnet 50 and the pole pieces proximate the North magnetic pole of the magnet. The flux lines pass through this airgap along a path of least reluctance from the North magnetic pole region into the pole pieces in an equally distributed manner because of the physical location of the North magnetic pole at the midpoint between the two pole pieces. The position of the rotatable magnet 50 in FIG. 7 is generally representative of its position at a neutral point of rotation or, most likely, the midpoint of its travel between its extremes. The lines of flux pass downward within the structure of the first and second pole pieces and through the first and third pole piece segments, 57 and 61. Because of the centrally positioned magnet, the lines of flux do not exhibit a preference for one pole piece segment relative to another. This results in the generally balanced distribution of the lines of flux in FIG. 7. As can also be seen, the flux lines bend inwardly as they reach the bottom portion of the first and third pole piece segments. The proximity of the South pole to the bottom portions of both the first and third pole piece segments attracts the lines of flux from the pole pieces, across the airgap and into the rotatable magnet 50. The second and fourth pole piece segments, 58 and 62, transmit very little magnetic field when the magnet is centrally positioned as shown in FIG. 7. Therefore, this central position of the rotatable magnet 50 results in a very low magnetic field being imposed on the Hall effect element and results in a minimal electrical signal emanating from the outputs of the system which comprises the printed circuit board 18 and the Hall effect element 16.

Figure 8:
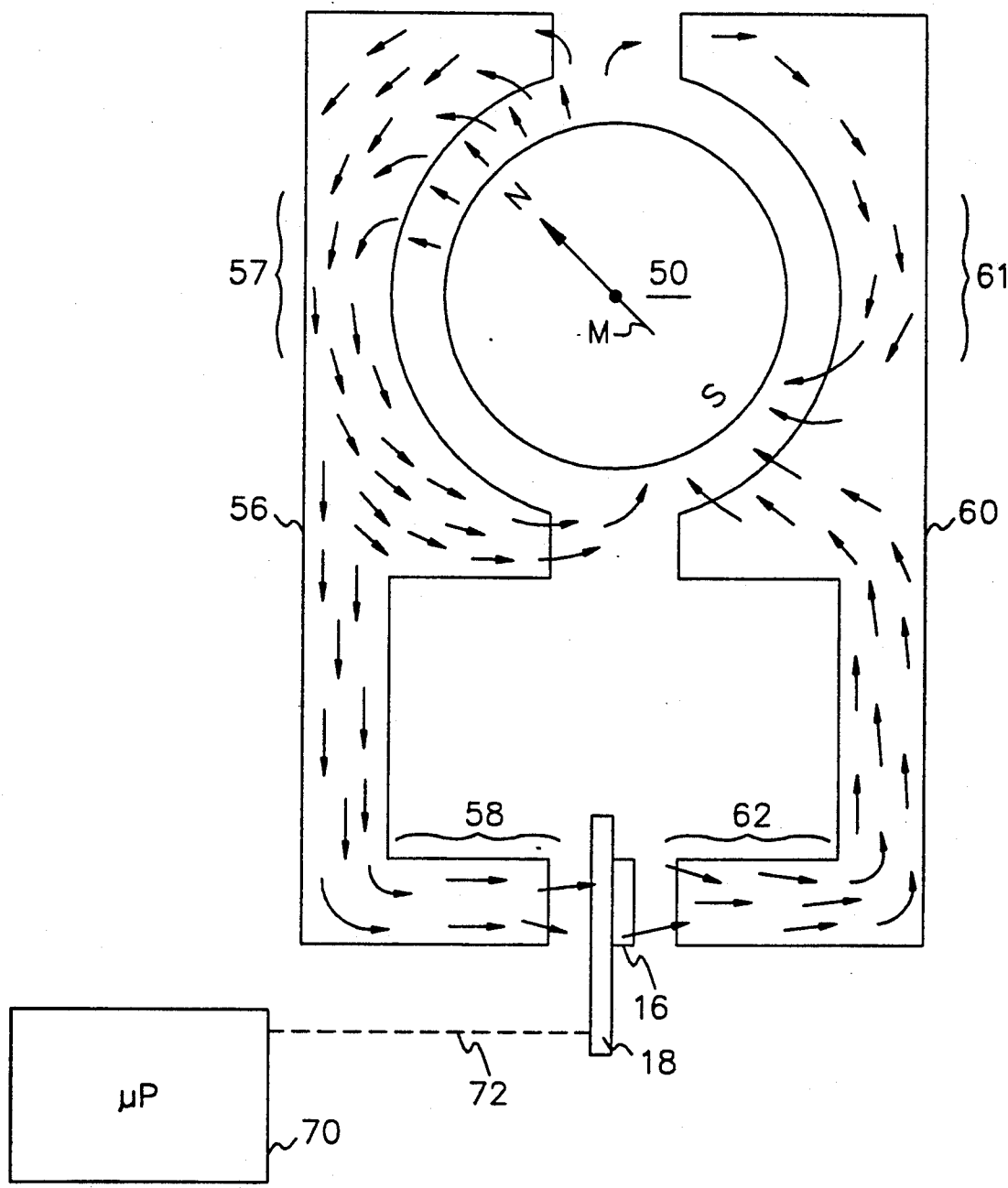
FIG. 8 shows a second operative position of the third embodiment of the present invention.

FIG. 8 shows the embodiment of FIGS. 6 and 7, but with the rotatable magnet 50 moved to a position that is different than that illustrated in FIG. 7. In FIG. 8, the rotatable magnet 50 is shown rotated counterclockwise relative to its position in FIG. 7. The North pole has been moved toward the left and in closer magnetic field relation with the first pole piece segment 57 than with the third pole piece segment 61. As represented by the arrows of the lines of flux in FIG. 8, it can be seen that a significant portion of the magnetic field passing from the North magnetic pole passes into the upper region of the first pole piece segment 57. A much smaller portion of this magnetic flux emanating from the North magnetic pole passes into the upper region of the third pole piece segment 61. After the lines of flux enter the first pole piece segment 57, they pass downwardly toward the lower portion of the first pole piece segment at which point they diverge into two alternative magnetic circuit paths. One path comprises the lower portion of the first pole piece segment which extends inwardly toward the center of the device and the second pole piece 60. This magnetic short circuit permits the flux lines to reconnect with the South magnetic pole of the rotatable magnet 50. However, the reluctance of this path is increased by the movement of the South magnetic pole toward the right as a result of the counterclockwise motion of the magnet. This increased reluctance of the short magnetic circuit path induces an increased portion of the magnetic field to pass downwardly through the first pole piece 56 toward the second pole piece segment 58. This can be seen by comparing FIGS. 7 and 8. This increased magnetic field passing through the second pole piece segment 58 increases the strength of the magnetic field passing through the magnetically sensitive device, or Hall effect element 16. After passing through the Hall effect element 16, the lines of flux continue into the fourth pole piece segment 62 and upwardly through the second pole piece 60 toward the South magnetic pole of the rotatable magnet 50. As can be seen in FIGS. 7 and 8, rotation of the rotatable magnet 50 from its position in FIG. 7 to its position in FIG. 8 causes an increase in the magnitude of the magnetic field imposed on the Hall effect element and therefore permits the Hall effect element to sense the rotational position of the magnet and the shaft to which it is connected. By attaching the shaft of the rotatable magnet in coordinated movement relation with a throttle device, the angular position of the throttle device can be determined by the output from the Hall effect element. In addition, the use of the first and second pole pieces of the present invention provides a decreased sensitivity to the precise physical position of the rotatable magnet with respect to the Hall effect element and therefore improves the accuracy of the overall system and reduces the dependency of the system on the accurate placement of the central axis of rotation of the rotatable magnet with respect to the magnetically sensitive device.

FIG. 8 also shows the printed circuit board 18 connected in signal communication with a microprocessor 70. In a typical application of an angular position sensor, as is well known to those skilled in the art, the printed circuit board 18 comprises a plurality of electronic components that operate as an amplification circuit for the relatively small signals typically provided by the Hall effect element itself. The amplified signals can then be communicated, from terminals such as those identified by reference numerals 21-23 in FIG. 1, to a device that uses those signals to control the operation of an apparatus such as the internal combustion engine of an automobile. In FIG. 8, the signal communication is represented by dashed line 72 and the microprocessor is identified by reference numeral 70.

Figure 9B:
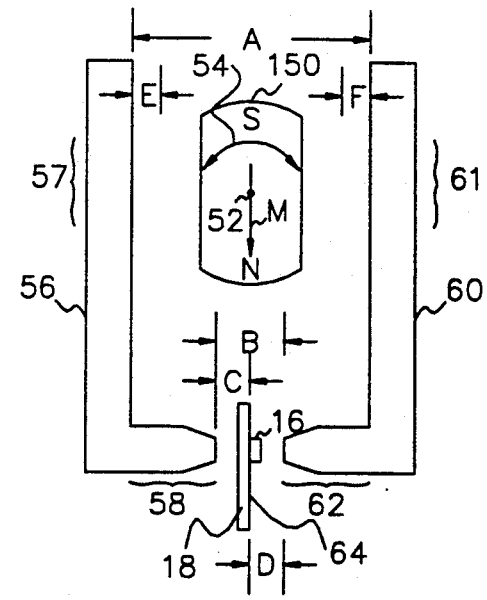
FIGS. 9A, 9B and 9C show alternative configurations of the embodiments shown in FIG. 4, 5 and 6 with different shaped rotatable magnets.
Figure 9A:
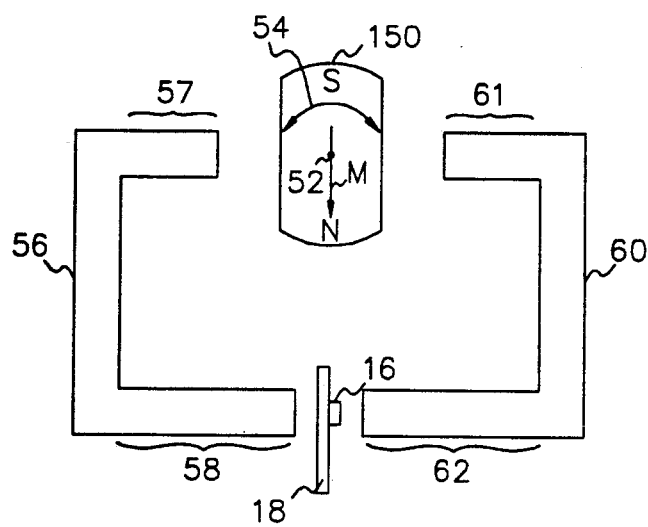
Figure 9C:
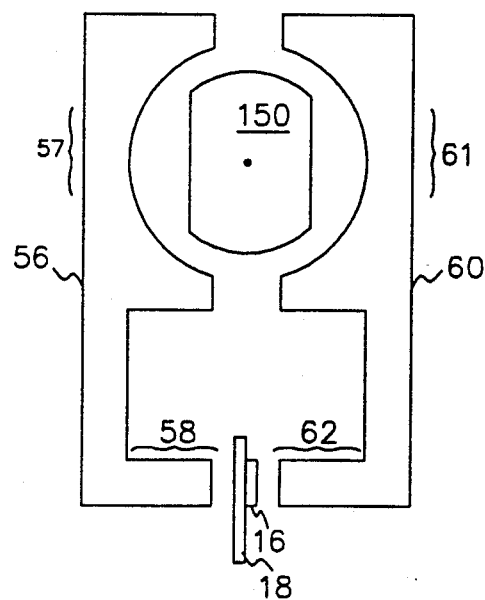

Although the present invention has been described in terms of a rotatable magnet 50 which is generally circular in the illustrations shown in FIGS. 1, 4, 5, 6, 7 and 8, it should be clearly understood that the shape of the rotatable magnet 50 is not restricted to this or any other particular shape according to the present invention. For example, rotatable magnets which are rectangular or rectangular with rounded ends can also be used in association with the present invention. To illustrate this concept, FIGS. 9A, 9B and 9C show the embodiments illustrated in FIGS. 4, 5 and 6, but with the circular rotatable magnet 50 being replaced by a generally rectangular rotatable magnet 150. Although the ends of magnet 150 are generally rounded in FIGS. 9A, 9B and 9C, it should be clearly understood that the ends of the magnet can be flat surfaces like the sides. The primary purpose for the illustrations of FIGS. 9A, 9B and 9C is to emphasize the fact that the shape of the rotatable magnet is not a limiting factor in the scope of the present invention.

Although the present invention has been illustrated with significant specificity and alternative embodiments of the present invention have been described with considerable detail, it should be understood that additional alternative embodiments of the present invention are within its scope. It should be further understood that the present invention can be configured in alternative shapes not illustrated in the figures and, in addition, the present invention can comprise components of varying size and of many different types of materials that can conduct a magnetic field. In addition, although the present invention has been described with repeated reference to Hall effect elements, it should be understood that alternative materials, such as permalloy structures, can be used to sense the strength of the magnetic field.

The embodiments of the invention in which an exclusive property or right is claimed are defined as follows:

1. An angular position sensor, comprising:
   a rotatable magnet arranged for rotation about a first axis;
   a magnetically sensitive device spaced apart from said magnet, said device being sensitive to the magnitude and direction of a magnetic field imposed on it for providing an output signal indicative of the angular position of said rotatable magnet;
   a first pole piece having a first pole piece segment and a second pole piece segment; and
   a second pole piece having a third pole piece segment and a fourth pole piece segment, said first and third pole piece segments being spaced apart from each other and disposed on opposite sides of said magnet on a first imaginary line which extends through said first axis of said magnet and is perpendicular to said first axis, said second and fourth pole piece segments being spaced apart from each other and disposed on opposite sides of said magnetically sensitive device on a second imaginary line which extends through said magnetically sensitive device, said first and second imaginary lines being disposed in a common plane which is perpendicular to said first axis, said first and second pole pieces having generally equal lengths between said first imaginary line and said magnetically sensitive device.

2. The sensor of claim 1, wherein:
said magnetically sensitive device is a Hall effect device.

3. The sensor of claim 1, wherein:
said first imaginary line is perpendicular to said first axis.

4. The sensor of claim 1, wherein:
said rotatable magnet is attached to a rotatable shaft of a throttle mechanism.

5. The sensor of claim 1, further comprising:
an amplification circuit connected in electrical communication with said magnetically sensitive device, said circuit providing an output representative of the magnetic field strength imposed on said magnetically sensitive device.

6. The sensor of claim 5, further comprising:
a microprocessor connected in signal communication with said output of said circuit.

7. The sensor of claim 1, wherein:
said first and second pole pieces, said magnet and said magnetically sensitive device combine to provide a continuous magnetic circuit having airgaps between said first and third pole piece segments and said magnet and between said second and fourth pole piece segments and said magnetically sensitive device.

8. An angular position sensor, comprising:
a magnet attached to a first shaft for rotation about a first axis;
a first pole piece having first and second pole piece segments;
a second pole piece having third and fourth pole piece segments, said first and third pole piece segments being spaced apart from each other by a fires predetermined distance, said first and third pole piece segments being disposed in magnetic field communication with said magnet, said magnet being disposed between said first and third pole piece segments, said first and second pole pieces being disposed in a common plane which is perpendicular to said first axis; and
a magnetically sensitive device, said second and fourth pole piece segments being spaced apart form each other by a second predetermined distance, said second and fourth pole piece segments being disposed in magnetic field communication with said magnetically sensitive device, said first and second pole pieces being in magnetic field communication with said magnet and said magnetically sensitive device to form a magnetic circuit with air gaps between said first and third pole piece segments and said magnet and between said second and fourth pole piece segments and said magnetically sensitive device, said device being sensitive to the magnitude and direction of a magnetic field imposed on it for providing an output signal indicative of the angular position of said first shaft, said first and second pole pieces being generally equal in length between said magnet and said magnetically sensitive device.

9. The sensor of claim 8, wherein:
said magnetically sensitive device is a Hall effect device.

10. The sensor of claim 9, wherein:
said first and third pole piece segments are disposed on an imaginary line that is perpendicular to said first axis.

11. The sensor of claim 10, wherein:
said first shaft is attached to a throttle mechanism.

12. The sensor of claim 11, further comprising:
an amplification circuit connected in electrical communication with said Hall effect device, said amplification circuit having an output that is representative of the strength of the magnetic field imposed on said Hall effect device.

13. The sensor of claim 12, further comprising:
a microprocessor connected in signal communication with said output of said amplification circuit.

14. An angular position sensor, comprising:
means for rotating a magnetic field about a first axis in coordinated movement with a rotatable member;
means for providing an electrical signal representative of the strength of said magnetic field at a preselected location spaced apart from said rotating means and indicative of the angular position of said rotatable member;
first means for confining a first portion of said magnetic field along a first magnetic path; and
second means for confining a second portion of said magnetic field along a second magnetic path, said rotating means being disposed between said first and second confining means, said rotating means and said first and second confining means being arranged to define a combined magnetic path extending through said providing means, said first and second confining means being disposed in a common plane which is perpendicular to said first axis, said first and second defined magnetic paths being generally equal in length.

15. The sensor of claim 14, wherein:
said first and second defined magnetic paths are contained within first and second pole pieces.

* * * * *